United States Patent
Zha (10) Patent No.: US 10,310,324 B2
(45) Date of Patent: Jun. 4, 2019

(54) BACKLIGHT MODULE (71) Applicant: Wuhan China Star Optoelectronics Technology Co., Ltd., Wuhan (CN)

(72) Inventor: Guowei Zha, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 350 days.

(21) Appl. No.: 15/115,913

(22) PCT Filed: Jun. 23, 2016

(86) PCT No.: PCT/CN2016/086853
§ 371 (c)(1),
(2) Date: Aug. 2, 2016

(87) PCT Pub. No.: WO2017/206221
PCT Pub. Date: Dec. 7, 2017

(65) Prior Publication Data
US 2018/0203296 A1     Jul. 19, 2018

(30) Foreign Application Priority Data
Jun. 1, 2016  (CN) .......................... 2016 1 0381636

(51) Int. Cl.
G02F 1/1335     (2006.01)
F21V 8/00       (2006.01)

(52) U.S. Cl.
CPC ....... *G02F 1/133602* (2013.01); *G02B 6/005* (2013.01); *G02B 6/0031* (2013.01);
(Continued)

(58) Field of Classification Search
CPC ......... G02F 1/133602; G02F 1/133528; G02F 2001/133548; G02B 6/0031
See application file for complete search history.

(56) References Cited

U.S. PATENT DOCUMENTS 5,616,986 A * 4/1997 Jacobsen ................. H01J 29/28
                                                    313/461
8,204,091 B2 * 6/2012 Hu ......................... H04N 9/3155
                                                    372/21
(Continued)

FOREIGN PATENT DOCUMENTS

CN           103228983 A       7/2013

*Primary Examiner* — Amare Mengistu
*Assistant Examiner* — Jennifer L Zubajlo
(74) *Attorney, Agent, or Firm* — Leong C. Lei (57) ABSTRACT The invention provides a backlight module, using blue backlight to excite the red, green QD films to obtain red and green fluorescence; and disposing two metal wire grids on both sides of the green QD film to form a Fabry-Perot cavity, the Fabry-Perot cavity able to select and enhance luminance intensity of a specific wavelength selected from the green light emitted by the green QD film so as to improve color purity and luminous intensity of the green light, and thus increase the color gamut of the backlight module, as well as improve the luminous efficiency of the green QD film, and significantly improve the low efficiency problem of fluorescence QD film. Moreover, the metal wire grid may form a brightness enhancing structure with the reflective layer of the backlight module to save setting up a brightness enhancing structure and reduce the thickness of the backlight module.

15 Claims, 8 Drawing Sheets

(52) U.S. Cl.
CPC ...... *G02F 1/133528* (2013.01); *G02B 6/0056* (2013.01); *G02F 2001/133548* (2013.01)

(56) References Cited

U.S. PATENT DOCUMENTS

| | | | | |
|---|---|---|---|---|
| 9,857,626 B1* | 1/2018 | Zha | | G02F 1/133528 |
| 2007/0229736 A1* | 10/2007 | Wang | | G02B 6/005 |
| | | | | 349/106 |
| 2008/0252799 A1* | 10/2008 | Lee | | G02B 5/3058 |
| | | | | 349/5 |
| 2011/0109850 A1* | 5/2011 | Hasegawa | | G02B 5/305 |
| | | | | 349/96 |
| 2012/0113672 A1* | 5/2012 | Dubrow | | B82Y 20/00 |
| | | | | 362/602 |
| 2012/0156714 A1* | 6/2012 | O'Brien | | G01J 3/2803 |
| | | | | 435/29 |
| 2012/0248402 A1* | 10/2012 | Rapaport | | B82Y 30/00 |
| | | | | 257/10 |
| 2012/0268809 A1* | 10/2012 | Guo | | G02F 1/216 |
| | | | | 359/359 |
| 2012/0287381 A1* | 11/2012 | Li | | G02F 1/133617 |
| | | | | 349/106 |
| 2013/0265522 A1* | 10/2013 | Jung | | G02F 1/1336 |
| | | | | 349/61 |
| 2013/0335677 A1* | 12/2013 | You | | G02F 1/133609 |
| | | | | 349/65 |
| 2014/0204319 A1* | 7/2014 | Cai | | G02F 1/133514 |
| | | | | 349/106 |
| 2014/0333679 A1* | 11/2014 | Fan | | G09G 5/10 |
| | | | | 345/690 |
| 2015/0085347 A1* | 3/2015 | Choi | | G02B 1/002 |
| | | | | 359/326 |
| 2015/0330603 A1* | 11/2015 | Oba | | C09K 19/14 |
| | | | | 349/71 |
| 2016/0003998 A1* | 1/2016 | Benoit | | G02F 1/133502 |
| | | | | 349/71 |
| 2016/0091657 A1* | 3/2016 | Yang | | G02F 1/133615 |
| | | | | 362/608 |
| 2016/0147101 A1* | 5/2016 | Saneto | | G02F 1/13362 |
| | | | | 349/71 |
| 2016/0161801 A1* | 6/2016 | Watano | | G02B 5/201 |
| | | | | 349/71 |
| 2016/0170114 A1* | 6/2016 | Watano | | G02B 5/3041 |
| | | | | 349/69 |
| 2016/0186960 A1* | 6/2016 | Kim | | G02F 1/133514 |
| | | | | 349/71 |
| 2016/0223162 A1* | 8/2016 | Shin | | C09K 11/06 |
| 2016/0223728 A1* | 8/2016 | Shin | | G02B 6/005 |
| 2016/0327720 A1* | 11/2016 | Cho | | B32B 3/30 |
| 2017/0102487 A1* | 4/2017 | Lee | | G02B 5/206 |
| 2017/0137627 A1* | 5/2017 | Szwarcman | | C09B 11/24 |
| 2017/0137628 A1* | 5/2017 | Szwarcman | | C09B 11/24 |
| 2017/0137630 A1* | 5/2017 | Szwarcman | | C09B 69/008 |
| 2017/0139270 A1* | 5/2017 | Szwarcman | | G02F 1/133514 |
| 2017/0139271 A1* | 5/2017 | Szwarcman | | G02F 1/133514 |
| 2017/0139277 A1* | 5/2017 | Szwarcman | | G02F 1/133621 |
| 2017/0186922 A1* | 6/2017 | Kim | | H01L 33/504 |
| 2017/0227819 A1* | 8/2017 | Fan | | G02F 1/133514 |
| 2017/0247610 A1* | 8/2017 | Kim | | C09K 11/06 |
| 2017/0255045 A1* | 9/2017 | Wei | | C23C 14/0652 |
| 2017/0255056 A1* | 9/2017 | Liu | | G02F 1/133512 |
| 2017/0256591 A1* | 9/2017 | Li | | H01L 33/504 |
| 2017/0260212 A1* | 9/2017 | Lee | | C07F 5/02 |
| 2017/0261673 A1* | 9/2017 | Kim | | G02B 6/005 |
| 2017/0269434 A1* | 9/2017 | Zhang | | G02F 1/1335 |
| 2017/0357127 A1* | 12/2017 | Cok | | G02F 1/133606 |
| 2018/0106939 A1* | 4/2018 | Cheng | | G02B 6/005 |
| 2018/0143469 A1* | 5/2018 | Cui | | G02F 1/1336 |
| 2018/0188610 A1* | 7/2018 | Shimizu | | G09G 3/20 |

* cited by examiner (Prior Art)
Fig. 1

(Prior Art)

BACKLIGHT MODULE

BACKGROUND OF THE INVENTION

1. Field of the Invention

The present invention relates to the field of display, and in particular to a backlight module.

2. The Related Arts

In the rapid development of display technology, the liquid crystal display (LCD) has the advantages of thinness, high display quality, and low power consumption, and is widely used in applications, such as, mobile phone, TV, personal digital assistant (PDA), digital camera, notebook PC, desktop PC, and so on, to become the mainstream display technology.

The majority of consumer LCDs is mostly backlight-type LCD, which comprises a liquid crystal (LC) display panel and a backlight module. The operation principle of the LCD is to dispose LC molecules between two parallel glass substrates, with a plurality of vertical and horizontal tiny wires between the two glass substrates. By allowing the electricity to flow through or not to change the orientation of LC molecules, the light emitted from the backlight is refracted to generate an image.

A high gamut panel can increase the color saturation and color reproduction. Currently, the demands on high gamut panels in increasingly higher than ever. Moreover, the high gamut property of the organic light-emitting diode (OLED) technology places a challenge to the conventional LCD. The approaches to increase the gamut include adjusting the position of the backlight source peak, using fluorescent powder, using quantum dots (QD) backlight, and adjusting the position and width at half maximum of color filter (CF) band.

Figure 1:
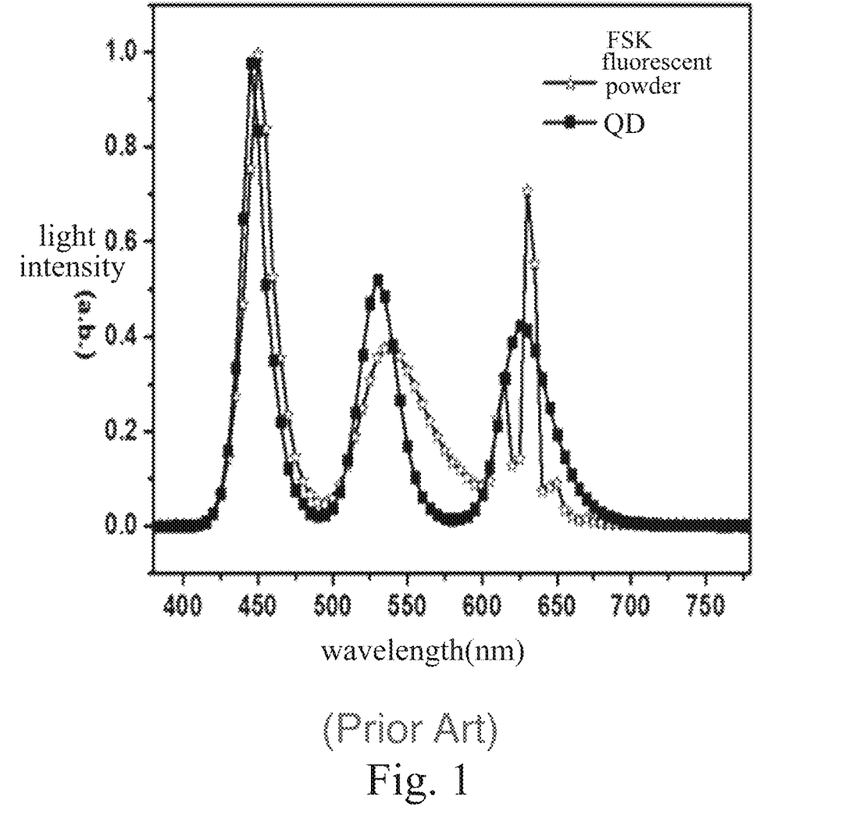
FIG. 1 is a schematic view showing a light emission spectrum comparison between the FSK fluorescent powder and quantum dots.
Figure 2:
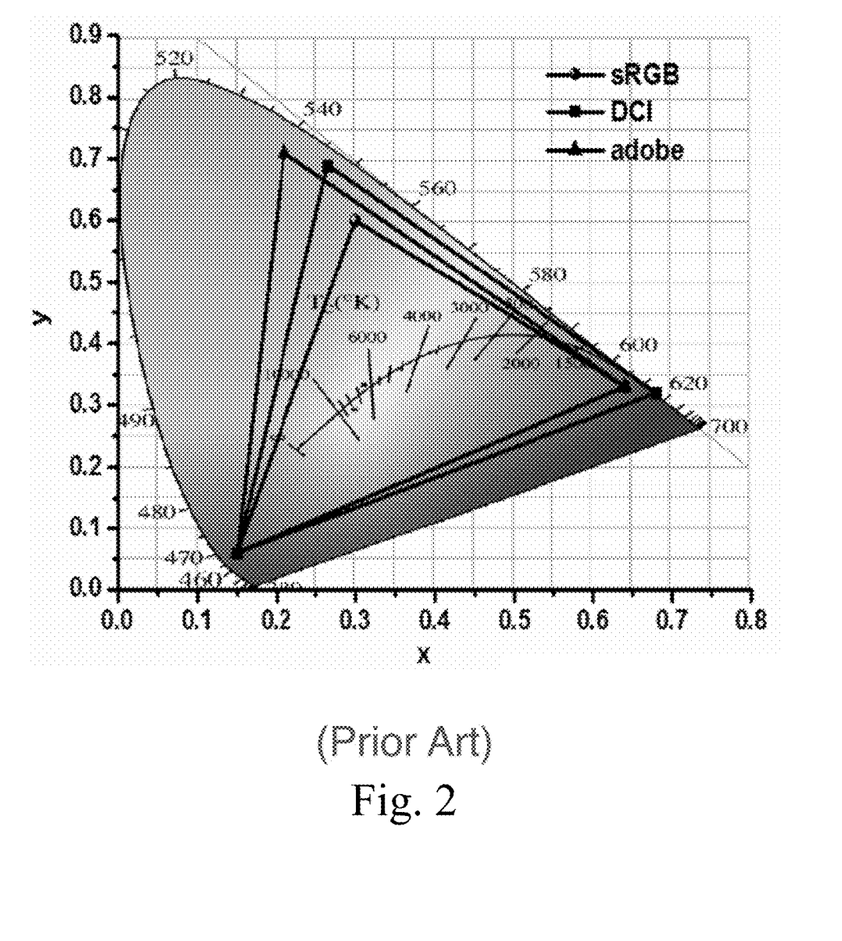
FIG. 2 is a schematic view showing the distribution of three gamut standards in the color coordinate system.

FIG. 1 is a schematic view showing light-emission spectrum comparison between KSF fluorescent powder and QDs. At present, for small size display, the more promising approach is to use blue light-emitting diode (LED) to irradiate the red and green QD film, wherein the light-emitting width of QD is about 30 nm. The narrow width guarantees the color purity of the backlight, which is critical to increasing gamut. As shown in FIG. 1, the KSF fluorescent powder displays discrete multi-peak signals in the red spectrum, with width of only about 20 nm, which is even more advantageous than the known red QD, while displays a broad spectrum distribution characteristics in the green spectrum. FIG. 2 is a schematic view showing the distribution of three color gamut standards in color coordinate system. As shown in FIG. 2, DCI P3, Adobe RGB and sRGB show smaller overall difference in the color coordinates for the red (R) and blue (B) color dots, while a larger difference in the color coordinates for the green (G) color dots, thus, increasing the color purity of the backlight green color dot is a simple and effective approach to increase gamut.

SUMMARY OF THE INVENTION

The object of the present invention is to provide a backlight module, able to increase the color purity and the luminance of the green light to improve the gamut of the backlight module.

To achieve the above object, the present invention provides a backlight module, which comprises: a light-guiding plate, a blue light source disposed on one side of the light-guiding plate, and a red light conversion layer and a green light conversion layer stacked and disposed above the light-exiting side of the light-guiding plate, wherein the red light conversion layer being stacked on top of the green light conversion layer, or vice versa; the red light conversion layer comprising a red quantum dot (QD) film; the green light conversion layer comprising a green QD film, and two metal wire grids disposed respectively on both sides of the green QD film; the metal wire grid comprising a dielectric layer and a plurality of metal wire grid units disposed on the dielectric layer and sequentially arranged; the metal wire grid unit comprising a metal strip and a strip-shaped space disposed on one side of the metal strip; the metal wire grid units of the two metal wire grids disposed on both sides of the green QD film being arranged in the same direction; the distance between the two metal wire grids disposed on both sides of the green QD film being a multiple of a specific green light wavelength, the specific green light wavelength being an arbitrary wavelength within a green light band emitted by the green QD film.

The green light band emitted by the green QD film is 500-600 nm, and the specific green light wavelength is an arbitrary wavelength within 500-600 nm.

The metal wire grid is disposed with the side disposed with dielectric layer or the side disposed with the plurality of metal wire grid units facing towards the green QD film.

In the metal wire grid unit, the metal strip and the strip-shaped space are both straight and parallel to each other.

P state is defined as the polarization direction perpendicular to the arrangement direction of the metal wire grid units, and S state is defined as the polarization direction parallel with the arrangement direction of the metal wire grid units; for S state, the metal wire grid only reflects the green light band emitted by the green QD film, and while for P state, the metal wire grid only lets the green light band emitted by the green QD film pass.

The metal strip is made of one or more of the following: aluminum, silver, and gold.

The dielectric layer comprises, from bottom to top in stack, a first dielectric layer, a second dielectric layer and a third dielectric layer, wherein the second dielectric layer has a higher refraction index higher than the first dielectric layer and the third dielectric layer.

The first dielectric layer and the third dielectric layer are made of one or more of the following materials: silicon dioxide, silicon oxide, and magnesium oxide; the second dielectric layer is made of one or more of the following materials: silicon nitride, titanium dioxide, and tantalum pentoxide.

The metal wire grid unit has a width of 200-500 nm, wherein the width of the metal strip makes up 0.4-0.9 of the width of the metal wire grid unit, and the metal strip has a height of 20-200 nm.

The backlight module further comprises: a reflective layer disposed below the light-guiding plate.

The present invention also provides a backlight module, which comprises: a light-guiding plate, a blue light source disposed on one side of the light-guiding plate, and a red light conversion layer and a green light conversion layer stacked and disposed above the light-exiting side of the light-guiding plate, wherein the red light conversion layer being stacked on top of the green light conversion layer, or vice versa; the red light conversion layer comprising a red quantum dot (QD) film; the green light conversion layer comprising a green QD film, and two metal wire grids disposed respectively on both sides of the green QD film; the metal wire grid comprising a dielectric layer and a plurality of metal wire grid units disposed on the dielectric layer and sequentially arranged; the metal wire grid unit comprising a metal strip and a strip-shaped space disposed on one side of the metal strip; the metal wire grid units of the two metal wire grids disposed on both sides of the green QD film being arranged in the same direction; the distance between the two metal wire grids disposed on both sides of the green QD film being a multiple of a specific green light wavelength, the specific green light wavelength being an arbitrary wavelength within a green light band emitted by the green QD film; wherein the green light band emitted by the green QD film being 500-600 nm, and the specific green light wavelength being an arbitrary wavelength within 500-600 nm; wherein the metal wire grid being disposed with the side disposed with dielectric layer or the side disposed with the plurality of metal wire grid units facing towards the green QD film; wherein in the metal wire grid unit, the metal strip and the strip-shaped space being both straight and parallel to each other.

Compared to the known techniques, the present invention provides the following advantages: the present invention provides a backlight module, using blue backlight to excite the red, green QD films to obtain red and green fluorescence; and disposing two metal wire grids on both sides of the green QD film to form a Fabry-Perot cavity, the Fabry-Perot cavity able to select and enhance luminance intensity of a specific wavelength selected from the green light emitted by the green QD film so as to improve color purity and luminous intensity of the green light, and thus increase the color gamut of the backlight module, as well as improve the luminous efficiency of the green QD film, and significantly improve the low efficiency problem of fluorescence QD film. Moreover, the metal wire grid may form a brightness enhancing structure with the reflective layer of the backlight module to save setting up a brightness enhancing structure and reduce the thickness of the backlight module.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 3:
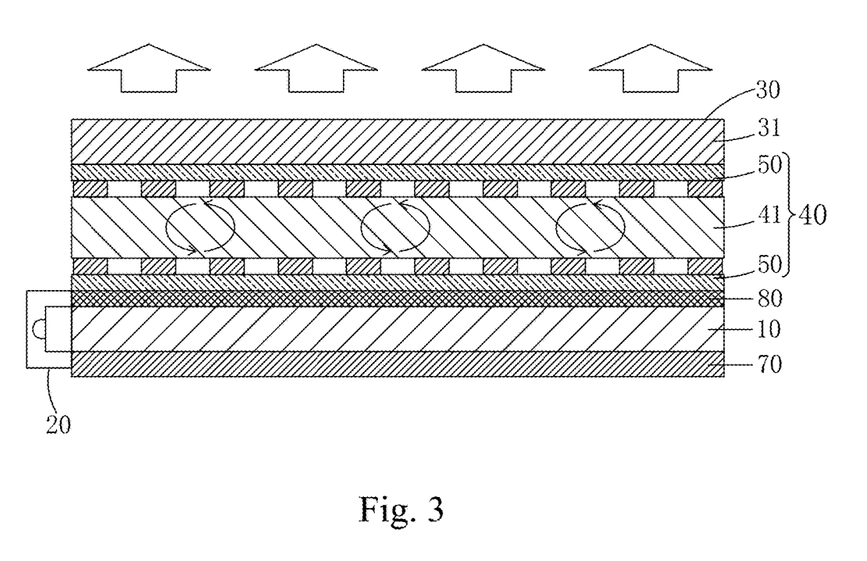
FIG. 3 is a schematic view showing the structure of the backlight module provided by an embodiment of the present invention.

Refer to FIG. 3. The present invention provides a backlight module, which comprises: a light-guiding plate 10, a blue light source 20 disposed on one side of the light-guiding plate 10, and a red light conversion layer 30 and a green light conversion layer 40 stacked and disposed above the light-exiting side of the light-guiding plate 10, wherein the red light conversion layer 30 being stacked on top of the green light conversion layer 40, or vice versa.

The red light conversion layer 30 comprises a red quantum dot (QD) film 31.

The green light conversion layer 40 comprises a green QD film 41, and two metal wire grids 50 disposed respectively on both sides of the green QD film 41.

The metal wire grid 50 comprises a dielectric layer 90 and a plurality of metal wire grid units 60 disposed on the dielectric layer 90 and sequentially arranged. The metal wire grid unit 60 comprises a metal strip 61 and a strip-shaped space 62 disposed on one side of the metal strip 61. The metal wire grid units 60 of the two metal wire grids 50 disposed on both sides of the green QD film 41 are arranged in the same direction.

The distance between the two metal wire grids 50 disposed on both sides of the green QD film 41 is a multiple of a specific green light wavelength, the specific green light wavelength being an arbitrary wavelength within a green light band emitted by the green QD film 41.

Specifically, the green light band emitted by the green QD film 41 is 500-600 nm, and the specific green light wavelength is an arbitrary wavelength within 500-600 nm.

Specifically, the specific green wavelength is selected according to the requirements of the color gamut of the backlight module.

Specifically, the blue light emitted from the light-guiding plate 10 by the blue light source 20 is mixed with the red and green light emitted by the red light conversion layer 30 and the green light conversion layer 40 to form a white light; in other words, the light from the backlight module of the present invention is a white light.

Specifically, the metal wire grid 50 is disposed with the side disposed with dielectric layer 90 or the side disposed with the plurality of metal wire grid units 60 facing towards the green QD film 41.

Specifically, in the metal wire grid unit 60, the metal strip 61 and the strip-shaped space 62 are both straight and parallel to each other.

In the present invention, the two metal wire grids 50 disposed on both sides of the green QD film 41 form a Fabry-Perot cavity, which is able to select a specific green wavelength and clearly enhance the luminance intensity of the selected specific green wavelength.

Figure 5A:
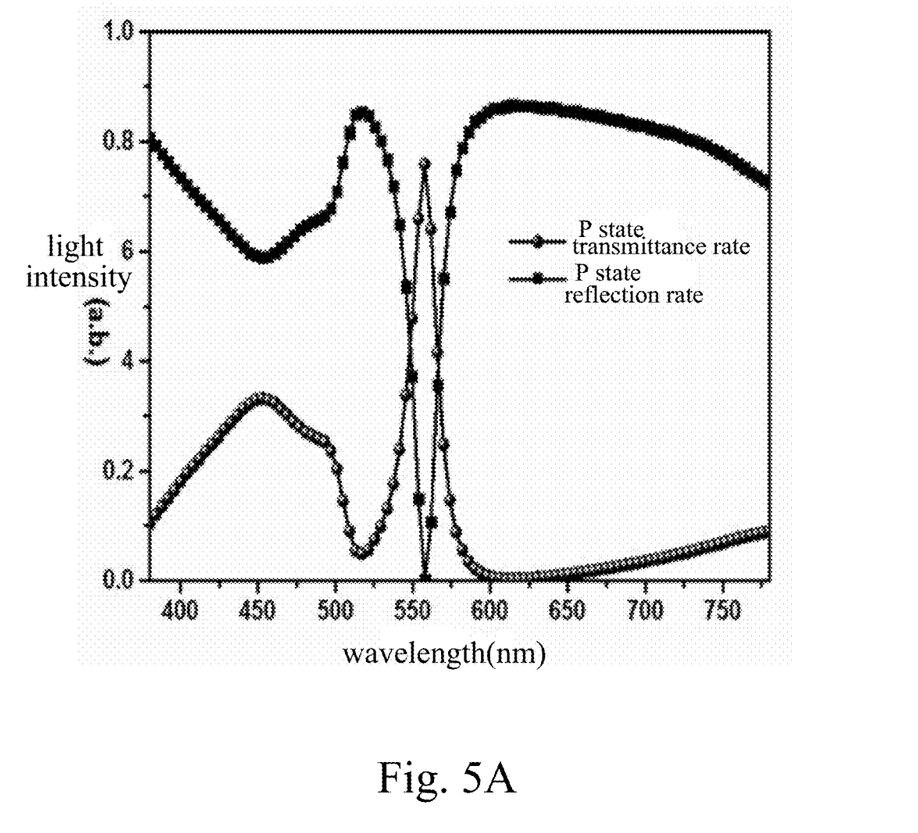
FIG. 5A is a schematic view showing the reflection and transmittance regarding the P state light by the metal wire grid of the backlight module provided by an embodiment of the present invention.
Figure 5B:
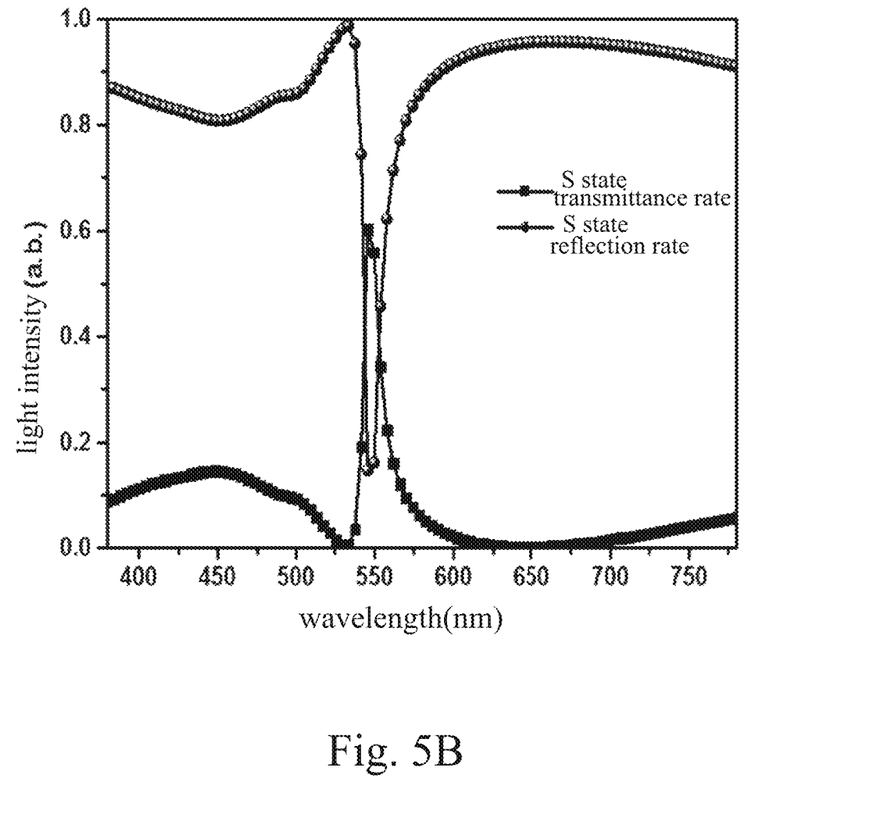
FIG. 5B is a schematic view showing the reflection and transmittance regarding the S state light by the metal wire grid of the backlight module provided by an embodiment of the present invention.

Specifically, the metal wire 4 grid 50 has the properties of polarization selective, selective transmittance of wavelength, and selective reflection of wavelength. If P state is defined as the polarization direction perpendicular to the arrangement direction of the metal wire grid units 60, and S state is defined as the polarization direction parallel with the arrangement direction of the metal wire grid units 60, for S state, the metal wire grid 50 only reflects the green light band emitted by the green QD film 41, and while for P state, the metal wire grid 50 only lets the green light band emitted by the green QD film 41 pass. FIG. 5A is a schematic view showing the reflection and transmittance regarding the P state light by the metal wire grid, and FIG. 5B is a schematic view showing the reflection and transmittance regarding the S state light by the metal wire grid. As shown in FIG. 5B, in S state, the metal wire grid 50 only reflects the green light.

In the embodiment shown in FIG. 3, the red light conversion layer 30 is disposed on top of the green light conversion layer 40, and the green light conversion layer 40 is disposed on top of the light-guiding plate 10. The blue backlight emitted by the light-guiding plate 10 has a non-polarization characteristics, and therefore the S state blue light pass through the metal wire grids 50 located below the green QD film 41 to excite the green QD film 41 to form green light output, wherein because the S state green light will form resonance inside the Fabry-Pero cavity due to the reflective property of the metal wire grids 50, during which the S state green light will further excite by resonance excitation mode the green QD film 41 to emit light. And finally, by band gap limiting micro-cavities spontaneous emission density enhancement effect (Purcell effect) to enhance the green light signal in the green light emitted by the green QD film 41, of S state, and having wavelength matching the specific wavelength of the Fabry-Perot cavity, and ultimately the light of Fabry-Perot cavity leaks to form green light output signal.

In short, the Fabry-Perot cavity formed by the metal wire grids 50 at both sides of the green QD film 41 selects, by the gap width, polarization selection property, wavelength selective transmittance property and wavelength selective reflection property, a green light of specific wavelength, and enhances, by resonance and Purcell effect, the luminance intensity of the green light of specific wavelength to achieve high color purity and luminance intensity of the green light.

Figure 4:
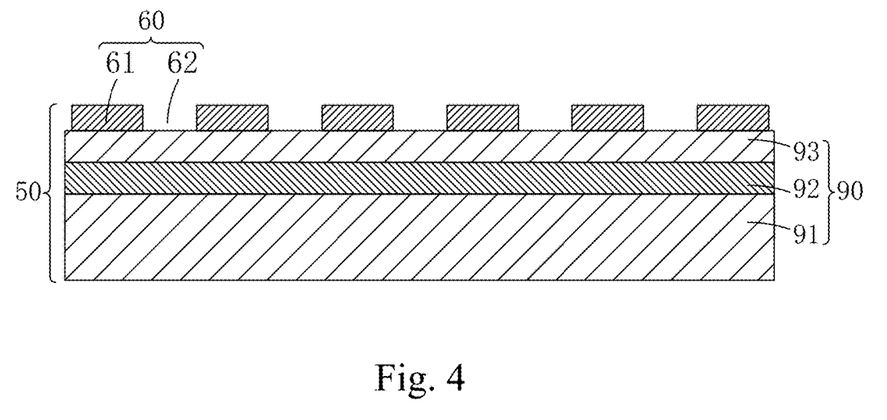
FIG. 4 is a schematic view showing the structure of the metal wire grid of the backlight module provided by an embodiment of the present invention.

Specifically, the metal strip 61 is made of a metal material which has larger imaginary part of the refractive index, such as, one or more of the following: aluminum (Al), silver (Ag), and gold (Au).

Specifically, as shown in FIG. 4, the dielectric layer 90 comprises, from bottom to top in stack, a first dielectric layer 91, a second dielectric layer 92 and a third dielectric layer 93, wherein the second dielectric layer 92 has a higher refraction index higher than the first dielectric layer 91 and the third dielectric layer 93 to form a sandwiched refractive index structure of low-high-low. Specifically, the first dielectric layer 91 and the third dielectric layer 93 are made of one or more of the following materials: silicon dioxide ($SiO_2$), silicon oxide (SiO), and magnesium oxide (MgO); the second dielectric layer is made of one or more of the following materials: silicon nitride ($Si_3N_4$), titanium dioxide ($TiO_2$), and tantalum pentoxide ($Ta_2O_5$).

Specifically, the first dielectric layer 91, the second dielectric layer 92 and the third dielectric layer 93 all have a thickness of 30-200 nm. The first dielectric layer 91, the second dielectric layer 92 and the third dielectric layer 93 can have the same or different thickness.

Specifically, the dielectric layer 90 is a high transmittance layer. Preferably, the dielectric layer 90 is a transparent layer.

Specifically, the metal wire grid unit 60 has a width of 200-500 nm, wherein the width of the metal strip 61 makes up 0.4-0.9 of the width of the metal wire grid unit 60, and the metal strip 61 has a height of 20-200 nm.

Specifically, the metal wire grids 50 can also be used as a color filter for only allowing the green light to pass. When used as a color filter, the full width half maximum (FWHM) of the band pass is 20-50 nm, with center peak having a transmittance greater than 70%.

Specifically, the red QD film 31 and the green QD film 41 are made of one or more of CdS and CdSe.

Specifically, the excitation mode of the red QD film 31 is the normal mode, whose detailed description is omitted here.

Preferably, the backlight module of the present invention further comprises: a reflective layer 70 disposed below the light-guiding plate 10. Because the metal wire grids 50 shows the transmittance property for green light band emitted by the green QD film 41 in P state, the P state blue light will be reflected back to the light-guiding plate 10 and increase luminance intensity after the reflection by the reflection layer 70, which is equivalent to forming a luminance enhancing structure with the metal wire grids 50 below the green QD film 41 and the reflection layer 70 to save an additional luminance enhancing structure and reduce the thickness of the backlight module.

Preferably, the backlight module of the present invention further comprises: a diffuser, disposed between the light-guiding plate 10 and the red light conversion layer 30 or the green light conversion layer 40, for luminance uniformity of the light-guiding plate 10.

Figure 6A:
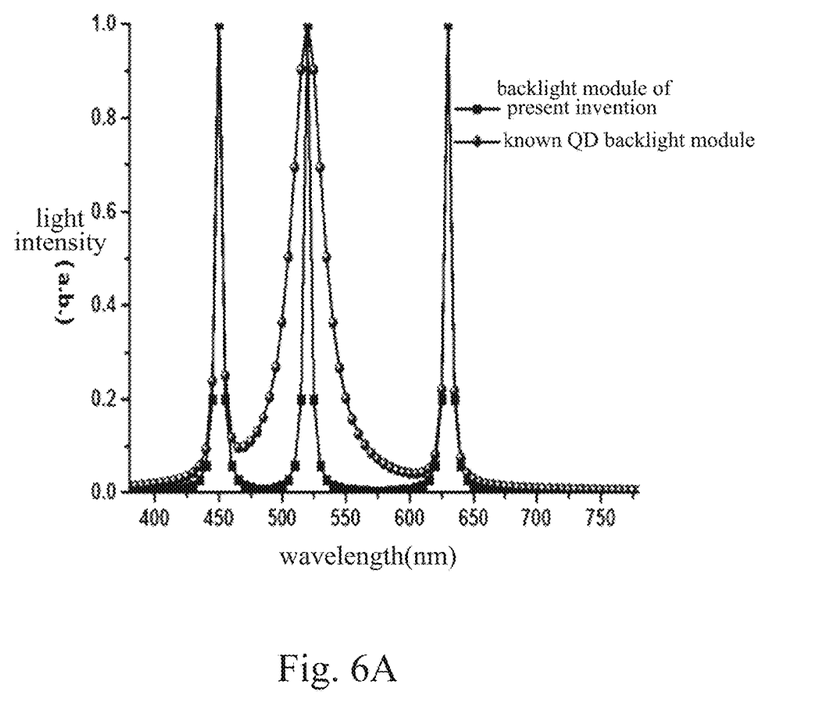
FIG. 6A is a schematic view showing the comparison of the light emission spectrum between the known QD backlight module and the backlight module provided by an embodiment of the present invention.
Figure 6B:
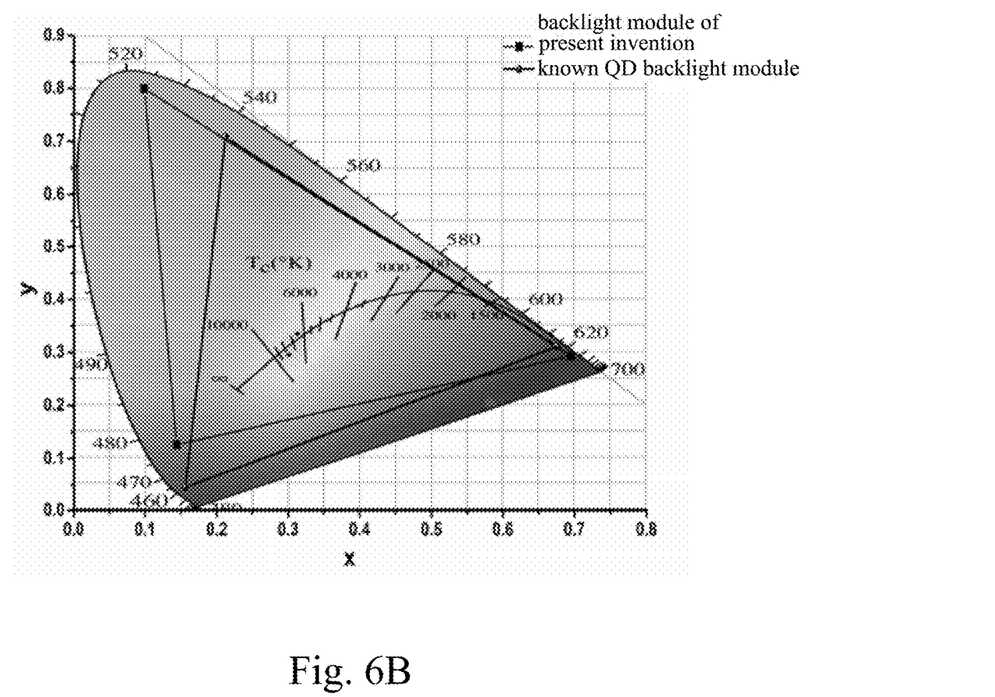
FIG. 6B is a schematic view showing the comparison of the gamut between the known QD backlight module and the backlight module provided by an embodiment of the present invention.

FIG. 6A is a schematic view showing the comparison of the light emission spectrum between the known QD backlight module and the backlight module provided by an embodiment of the present invention. As shown in FIG. 6A, compared to the known QD backlight module, the green light band in the present invention has the advantages of narrow line width and high color purity. FIG. 6B is a schematic view showing the comparison of the gamut between the known QD backlight module and the backlight module provided by an embodiment of the present invention. As shown in FIG. 6B, compared to the known QD backlight module, the green light band of the present invention has the advantage of high color purity, and the present invention provides a wider gamut.

In summary, the present invention provides a backlight module, using blue backlight to excite the red, green QD films to obtain red and green fluorescence; and disposing two metal wire grids on both sides of the green QD film to form a Fabry-Perot cavity, the Fabry-Perot cavity able to select and enhance luminance intensity of a specific wavelength selected from the green light emitted by the green QD film so as to improve color purity and luminous intensity of the green light, and thus increase the color gamut of the backlight module, as well as improve the luminous efficiency of the green QD film, and significantly improve the low efficiency problem of fluorescence QD film. Moreover, the metal wire grid may form a brightness enhancing structure with the reflective layer of the backlight module to save setting up a brightness enhancing structure and reduce the thickness of the backlight module.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A backlight module, which comprises: a light-guiding plate, a blue light source disposed on one side of the light-guiding plate, and a red light conversion layer and a green light conversion layer stacked and disposed above the light-exiting side of the light-guiding plate;
   the red light conversion layer comprising a red quantum dot (QD) film;
   the green light conversion layer comprising a green QD film, and two metal wire grids disposed respectively on both sides of the green QD film;
   the metal wire grid comprising a dielectric layer and a plurality of metal wire grid units disposed on the dielectric layer and sequentially arranged; the metal wire grid unit comprising a metal strip and a strip-shaped space disposed on one side of the metal strip; the metal wire grid units of the two metal wire grids disposed on both sides of the green QD film being arranged in the same direction;
   the distance between the two metal wire grids disposed on both sides of the green QD film being a multiple of a specific green light wavelength, the specific green light wavelength being an arbitrary wavelength within a green light band emitted by the green QD film;
   wherein P state is defined as the polarization direction perpendicular to the arrangement direction of the metal wire grid units, and S state is defined as the polarization direction parallel with the arrangement direction of the metal wire grid units; for S state, the metal wire grid only reflects the green light band emitted by the green QD film, and while for P state, the metal wire grid only lets the green light band emitted by the green QD film pass.

2. The backlight module as claimed in claim 1, wherein the green light band emitted by the green QD film is 500-600 nm, and the specific green light wavelength is an arbitrary wavelength within 500-600 nm.

3. The backlight module as claimed in claim 1, wherein the metal wire grid is disposed with the side disposed with dielectric layer or the side disposed with the plurality of metal wire grid units facing towards the green QD film.

4. The backlight module as claimed in claim 1, wherein in the metal wire grid unit, the metal strip and the strip-shaped space are both straight and parallel to each other.

5. The backlight module as claimed in claim 1, wherein the metal strip is made of one or more of the following: aluminum, silver, and gold.

6. The backlight module as claimed in claim 1, wherein the dielectric layer comprises, from bottom to top in stack, a first dielectric layer, a second dielectric layer and a third dielectric layer, wherein the second dielectric layer has a higher refraction index higher than the first dielectric layer and the third dielectric layer.

7. The backlight module as claimed in claim 6, wherein the first dielectric layer and the third dielectric layer are made of one or more of the following materials: silicon dioxide, silicon oxide, and magnesium oxide; the second dielectric layer is made of one or more of the following materials: silicon nitride, titanium dioxide, and tantalum pentoxide.

8. The backlight module as claimed in claim 1, wherein the metal wire grid unit has a width of 200-500 nm, wherein the width of the metal strip makes up 0.4-0.9 of the width of the metal wire grid unit, and the metal strip has a height of 20-200 nm.

9. The backlight module as claimed in claim 1, wherein the backlight module further comprises: a reflective layer disposed below the light-guiding plate.

10. A backlight module, which comprises: a light-guiding plate, a blue light source disposed on one side of the light-guiding plate, and a red light conversion layer and a green light conversion layer stacked and disposed above the light-exiting side of the light-guiding plate;
    the red light conversion layer comprising a red quantum dot (QD) film;
    the green light conversion layer comprising a green QD film, and two metal wire grids disposed respectively on both sides of the green QD film;
    the metal wire grid comprising a dielectric layer and a plurality of metal wire grid units disposed on the dielectric layer and sequentially arranged; the metal wire grid unit comprising a metal strip and a strip-shaped space disposed on one side of the metal strip; the metal wire grid units of the two metal wire grids disposed on both sides of the green QD film being arranged in the same direction;
    the distance between the two metal wire grids disposed on both sides of the green QD film being a multiple of a specific green light wavelength, the specific green light wavelength being an arbitrary wavelength within a green light band emitted by the green QD film;
    wherein P state is defined as the polarization direction perpendicular to the arrangement direction of the metal wire grid units, and S state is defined as the polarization direction parallel with the arrangement direction of the metal wire grid units; for S state, the metal wire grid only reflects the green light band emitted by the green QD film, and while for P state, the metal wire grid only lets the green light band emitted by the green QD film pass;
    wherein the green light band emitted by the green QD film being 500-600 nm, and the specific green light wavelength being an arbitrary wavelength within 500-600 nm;
    wherein the metal wire grid being disposed with the side disposed with dielectric layer or the side disposed with the plurality of metal wire grid units facing towards the green QD film;
    wherein in the metal wire grid unit, the metal strip and the strip-shaped space being both straight and parallel to each other.

11. The backlight module as claimed in claim 10, wherein the metal strip is made of one or more of the following: aluminum, silver, and gold.

12. The backlight module as claimed in claim 10, wherein the dielectric layer comprises, from bottom to top in stack, a first dielectric layer, a second dielectric layer and a third dielectric layer, wherein the second dielectric layer has a higher refraction index higher than the first dielectric layer and the third dielectric layer.

13. The backlight module as claimed in claim 12, wherein the first dielectric layer and the third dielectric layer are made of one or more of the following materials: silicon dioxide, silicon oxide, and magnesium oxide; the second dielectric layer is made of one or more of the following materials: silicon nitride, titanium dioxide, and tantalum pentoxide.

14. The backlight module as claimed in claim 10, wherein the metal wire grid unit has a width of 200-500 nm, wherein the width of the metal strip makes up 0.4-0.9 of the width of the metal wire grid unit, and the metal strip has a height of 20-200 nm.

15. The backlight module as claimed in claim 10, wherein the backlight module further comprises: a reflective layer disposed below the light-guiding plate.

\* \* \* \* \*